(12) United States Patent
Kumar et al.

(10) Patent No.: US 12,360,854 B2
(45) Date of Patent: Jul. 15, 2025

(54) DYNAMIC POLICY CREATION AND ADHOC BACKUPS USING DATA CRITICALITY

(71) Applicant: Dell Products L.P., Round Rock, TX (US)

(72) Inventors: Avinash Kumar, Patna (IN); Mahesh Reddy Av, Bangalore (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/353,096

(22) Filed: Jul. 16, 2023

(65) Prior Publication Data

US 2025/0021443 A1  Jan. 16, 2025

(51) Int. Cl.
G06F 11/14 (2006.01)

(52) U.S. Cl.
CPC ...... *G06F 11/1461* (2013.01); *G06F 11/1435* (2013.01); *G06F 11/1453* (2013.01); *G06F 11/1464* (2013.01)

(58) Field of Classification Search
CPC ............ G06F 11/1461; G06F 11/1435; G06F 11/1453; G06F 11/1458; G06F 11/1464
USPC ......................................................... 714/6.3
See application file for complete search history.

(56) References Cited

U.S. PATENT DOCUMENTS

| | | | | |
|---|---|---|---|---|
| 9,678,836 B1* | 6/2017 | Westenberg | .......... | G06F 16/122 |
| 10,061,657 B1* | 8/2018 | Chopra | ............... | G06F 11/1461 |
| 11,442,793 B1* | 9/2022 | Kulkarni | ............... | G06F 9/5083 |
| 11,448,598 B1* | 9/2022 | Bhartia | ............... | G01N 21/359 |
| 2012/0054155 A1* | 3/2012 | Darcy | .................. | G06F 11/2094 |
| | | | | 707/654 |
| 2012/0191658 A1* | 7/2012 | Ambat | ................ | G06F 21/6209 |
| | | | | 707/654 |
| 2019/0392075 A1* | 12/2019 | Han | ...................... | G06F 16/285 |
| 2020/0034041 A1* | 1/2020 | Zhang | ................ | G06F 21/6218 |
| 2022/0012672 A1* | 1/2022 | Inman | ................ | G06Q 10/1053 |
| 2022/0245033 A1* | 8/2022 | Zou | ..................... | G06F 11/1464 |
| 2022/0382780 A1* | 12/2022 | Kumar | ................... | G06N 20/00 |
| 2022/0404971 A1* | 12/2022 | Subramaniam | ......... | G06F 3/067 |
| 2023/0333941 A1* | 10/2023 | Singhal | ............... | G06F 11/1464 |

* cited by examiner

*Primary Examiner* — Chae M Ko
(74) *Attorney, Agent, or Firm* — Staniford Tomita LLP

(57) ABSTRACT

A dynamic data policy creation process utilizes certain supervised learning processes to classify data criticality for tagged clients to provide dynamic policy definitions and process adhoc (special) backup requests. Such embodiments prevent the need to manually determine criticality and create protection policies whenever a new data object into the system. A data tagger and KNN-based classifier provide an intelligent solution to data protection ecosystems to meet the dynamic request of data objects through a dynamic backup policy creation system and method that uses certain artificial intelligence (AI) and machine learning (ML) based solutions.

20 Claims, 6 Drawing Sheets

DYNAMIC POLICY CREATION AND ADHOC BACKUPS USING DATA CRITICALITY

TECHNICAL FIELD

Embodiments are generally directed to large-scale backup systems and more specifically to creating dynamic policies and accommodating adhoc backup requests.

BACKGROUND

With ever increasing amounts of data and the need for scalability in enterprise level data systems, the data to be backed up and restored can vary widely with regards to criticality. In normal cases, most data is routine business or operational data that is backed up on a daily or weekly basis per normal protection policies that dictate backup period, storage target, retention period, and so on. Frequently, however, certain data may be critical or sensitive in nature, and needs to be protected by more rigorous policies. Such data may be presented to the system in the form of adhoc (specialized) backup requests. Current backup systems force users and administrators to manually create protection polices for every new data object that may be processed in such a backup. This can impose a serious cost of user time and manual effort, which ultimately impacts the user satisfaction levels. Such systems generally do not provide a sufficiently intelligent solution to data protection ecosystems to meet the dynamic request of data objects.

What is needed, therefore is a self-sufficient data protection solution with sufficient intelligence to create dynamic policies and address any special requests for new data objects.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning (e.g., KNN-based) processes using data criticality for tagged clients to provide dynamic policy definitions and process adhoc backup requests. Such embodiments overcome the issues associated with present methods including: (1) manual creation of policies whenever there is a new data object into the system, and (2) the need for an administrator to decide on the criticality of the adhoc object using the existing data and backup/data protection requirements.

Embodiments are directed to an intelligent solution to data protection ecosystems to meet the dynamic request of data objects through a dynamic backup policy creation system and method that uses certain artificial intelligence (AI) and machine learning (ML) based solutions, such as a KNN-based classifier.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
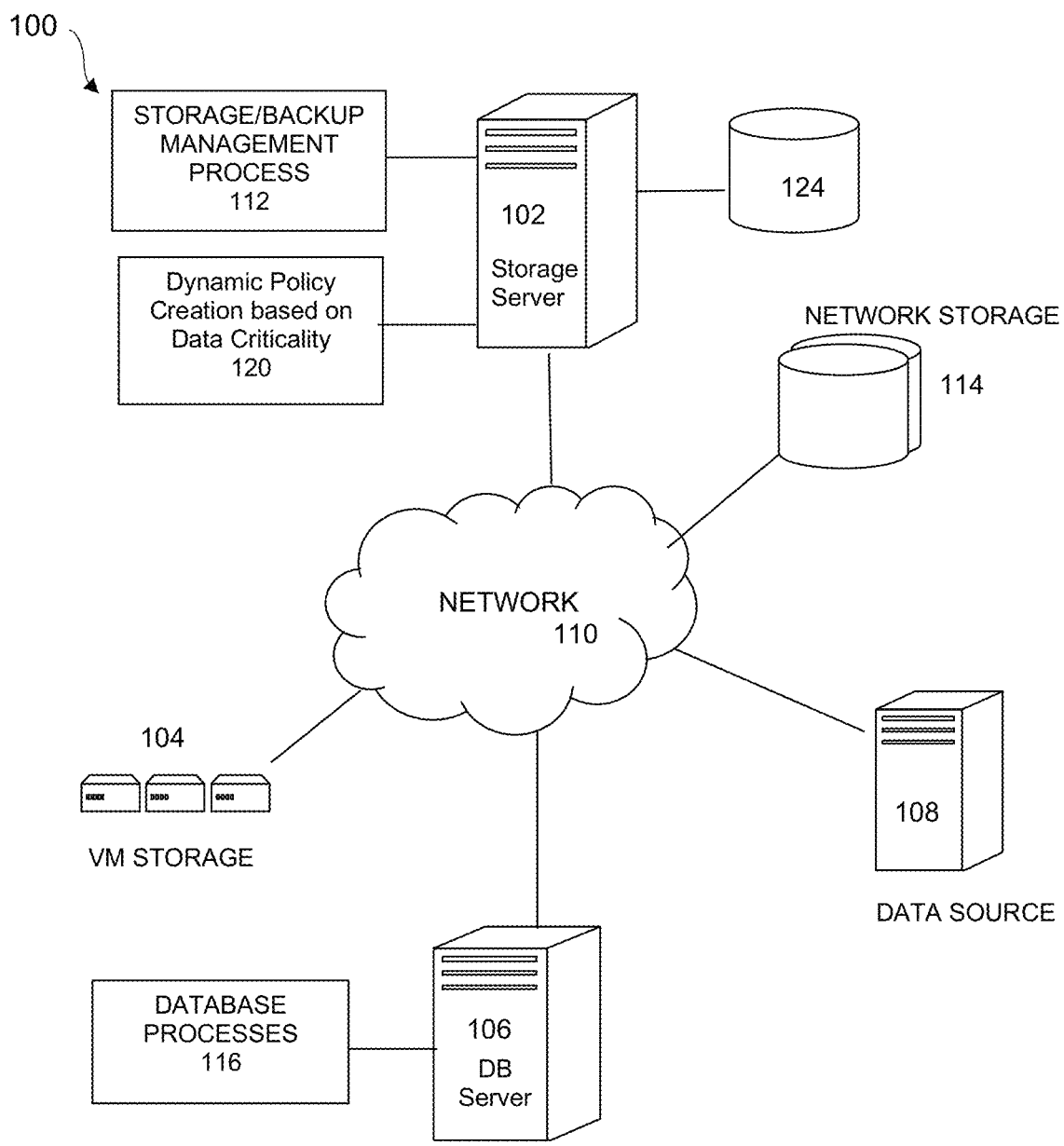
FIG. 1 illustrates a computer network system that implements one or more embodiments of a backup system using supervised learning to implement dynamic policy creation and adhoc backups.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

As stated above, most backup operations involve datasets that are anticipated over the course of normal operations, and backed up through standard policies, such as daily or weekly backups to normal storage targets. Occasionally though, critical data may be introduced that needs to be treated differently with regard to backup periods, handling, and/or storage targets. For example, critical and/or sensitive (confidential) data objects may need to be backed up immediately to local storage instead of waiting for the next incremental backup to cloud storage, and so on. To accommodate such requests, embodiments are directed to a method for intelligent policy creation for special or "adhoc" backups using client tagging. FIG. 1 illustrates a computer network system that implements one or more embodiments of a backup system using dynamic policy creation.

In system 100 of FIG. 1, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes a dynamic policy creation component 120 that incorporates intelligence to automatically accommodate adhoc backup requests for new data objects using certain tagging and AI-based classification technologies.

Figure 2:
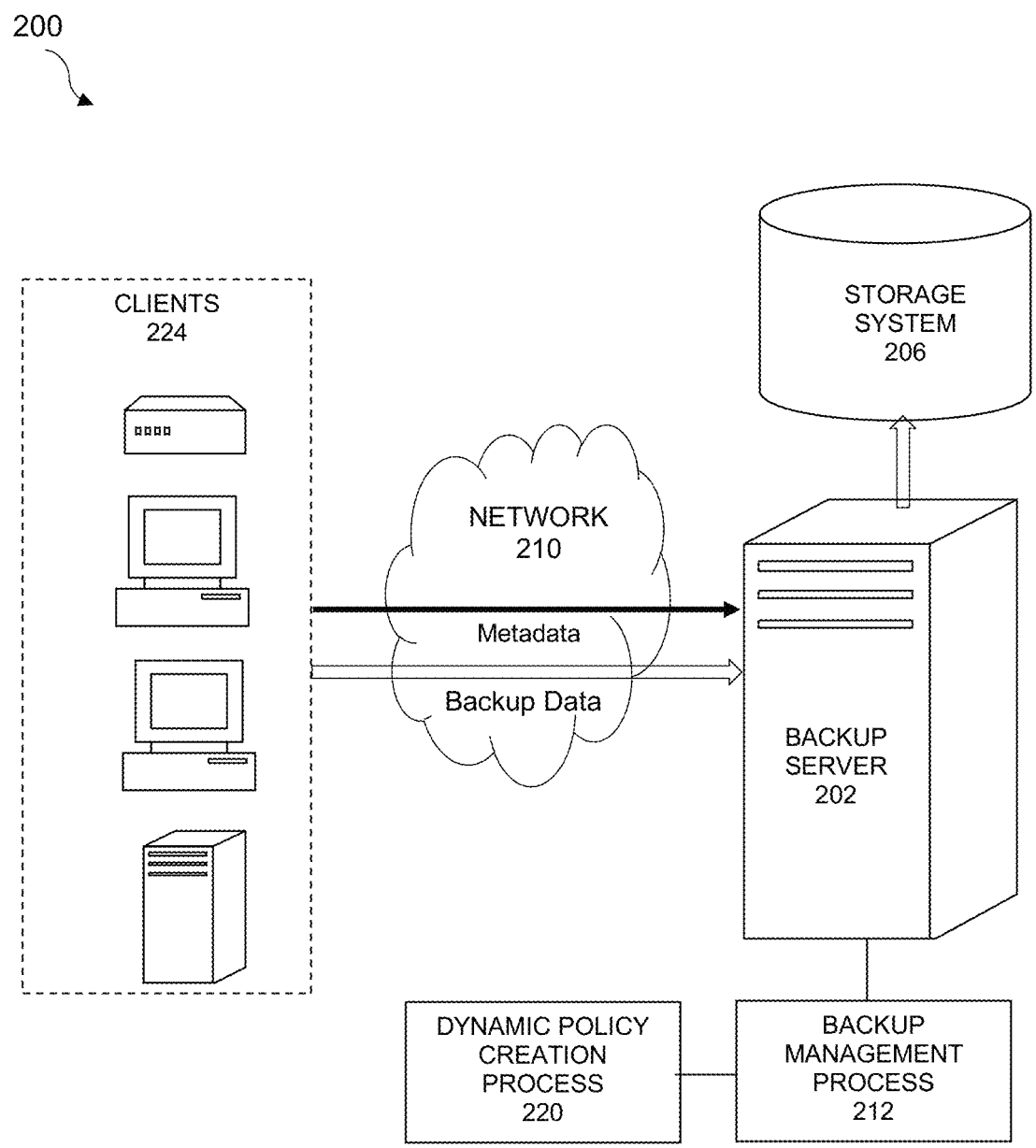
FIG. 2 illustrates a backup system with a variety of different backup clients generating data to be protected, under some embodiments.

In many a typical large-scale data protection system, there can be many different types of backup clients, each generating different data objects at different times to be included in one or more data savesets. FIG. 2 illustrates a backup system like that of FIG. 1, but with a variety of different backup clients 224, ranging from computers, laptops, mobile devices, network devices, servers, and so on, all backing up data and metadata over network 210 through backup server 202 to storage system 206 using a backup program 212. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client 224 may thus generate different data that maybe subject to different protection policies based on data type, importance, volume, storage requirements, and so on. In present systems, defining appropriate backup policies for each data type generally requires manual policy definitions by a user or system administrator.

Embodiments of systems 100 and 200 include respective dynamic policy creation processes 120 and 220 that dynamically and automatically create policy based on relative data criticality measure for the data. Embodiments described below may apply to either component 120 in the basic backup system of FIG. 1, or component 220 in the multi-client backup system of FIG. 2.

The component (120 or 220) provides dynamic policy creation and application to adhoc backups, which are backups where a large customer environment incorporates additional data objects outside of the planned operation cycle, and that may include critical data requiring special protection treatment. As stated previously, present systems require manual handling of these backups, or forcing these backups to use defined schedules and policies. Embodiments of the dynamic policy creation process 220 eliminate the need for this manual procedure and provides an intelligent solution powered by machine learning will create a policy to automatically align these data objects to appropriate policies. For example, consider a customer environment experiences a drastic increase in customers resulting in 150 virtual machines being added during the handling of a significant unexpected data change. In this case, process 220 will dynamically create one or more backup protection policies and align all 150 virtual machines according to the criticality of the application or applications that they are hosting.

The dynamic policy creation process 220 that empowers the system with a smart and automated way of handling any new data object into the overall data protection program including new clients 124, adhoc backups, new datasets, and so on. Such data objects can be new or different data objects for a particular client, or different data objects generated by different clients 124.

Figure 3:
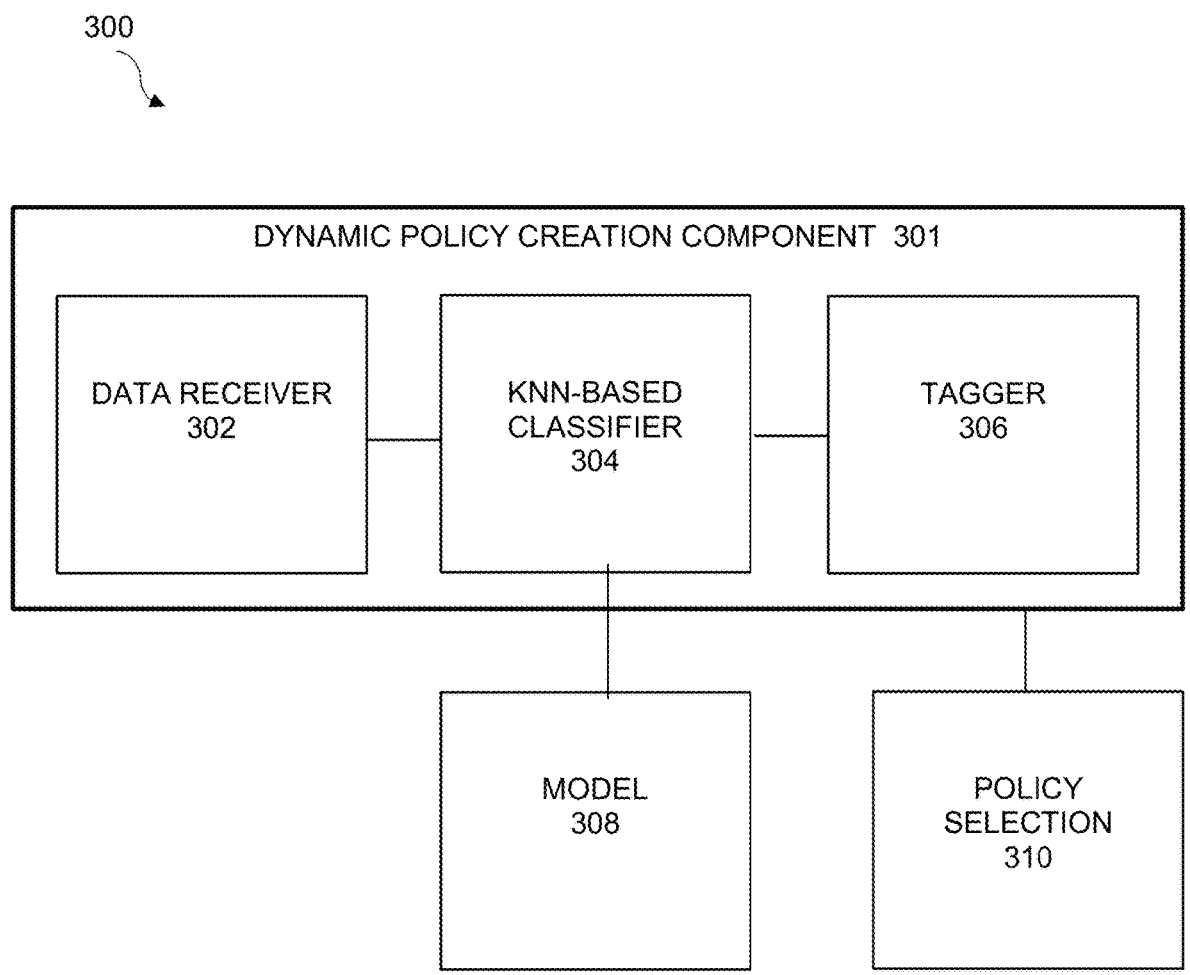
FIG. 3 is a block diagram of a dynamic policy creation component, under some embodiments.

FIG. 3 is a block diagram of a dynamic policy creation component 301, under some embodiments. As shown in FIG. 3, component 301 includes a data receiver 302 that receives data objects that require special handling, such as those presented for backup by adhoc backup requests or special data handling requests. Such data is termed "critical" or "sensitive" data and comprises data that is protected through enhanced or different policies as compared to "normal" data backed up and restored through routine or defined protection policies. Adhoc requests may also include requests beyond simply backing up data, such as requests to add or delete system resources, such as clients, VMs, and so on.

The received critical data objects are classified by a classifier process 304 as either critical or non-critical. The clients generating this data can also be classified as critical along with their data objects. The data that is classified as critical is then appropriately tagged through tagger 306 with certain metadata using a tagging process to signify important criticality parameters, such as data type, protection priority, special handling, and so on to match with appropriate protection policies. Various different parameters can be used to determine the criticality of data objects, such as data type, data source, storage requirements, lifecycle, application, user and so on. Other parameters for both client and data include: critical strings, nature of the application being hosted, number of applications, size, data leg, device ports, data path available, datastore size, provisioning details, and so on. The tagged data is then protected through the appropriately selected policy 310.

As shown in FIG. 3, system 300 makes use of use of historical data from users that train a ML model 308 to decide the selection or creation of protection policy 310 with the best attributes that would automatically process the newly received data object 302. The classifier model used will make use of the all the existing parameters from the historical data from the user environments (or lab) to decide on the closest match to any existing protection policy and create a new one with similar features to optimally protect the data object. It can also provide an option to process the data object through an existing policy depending upon its features and criticality. The ML model triggered policy creation component/process 301 will automatically ensure the object protection as soon as it is received into the user data protection environment.

The tagger 306 assigns criticality tags to data objects to ensure they are aligned with the appropriate backup protection policy and cycles. In an embodiment, the criticality tags are classified as P0 (highest priority tag), P1, P2, and so on, but any other or similar hierarchical tag may be used. In an embodiment, the tag comprises a key value having a format of "CRITICALITY_TAG" with an associated encoded scalar value (e.g., P0, P1. P2, etc.), wherein the associated value represents a priority value of a critical data object ranked along a defined scale, and wherein the defined scale is on the order of 1 to 5, in one of ascending or descending order of priority. Such scale levels can also be associated with qualitative descriptions, such as Platinum/Gold/Bronze, or High/Medium/Low, etc. to align with corresponding protection policies.

To tag the client and its data objects, component 301 use the KNN ML model for classifier 304. First, the client is tagged based on high-risk and criticality factors, and then the data objects under the client are tagged. For example, a client hosting a security-related application will be given a higher priority tag than a client hosting a gaming application. Similarly, a data object such as a file system under the tagged client will undergo further tagging based on the criticality factor of the file system and its usage.

With respect to the KNN-based classifier 304: KNN basically stands for k-nearest neighbors (KNN) algorithm, and is a classification algorithm that can be well used in case of classification and regression scenarios. KNN is a supervised learning algorithm that is dependent upon the labelled input data to study a function that would produce an output when a new unlabeled data is given as input. It classifies the data point on how its neighbor is classified. The basic principle of this model is to classify any new input data based on the similarity measure of the data points which was stored earlier. For example, consider a dataset of Coconut and Grapes. The KNN model will get trained with similar measures like shape, color, weight, etc. When some fruit comes, KNN will try to match its similarity with the color (red or yellow), weight and shape.

A similar analogy can be made with the properties of data object that we have used in tailoring the KNN model to fit the embodiment of FIG. 2. For example, if there are two Virtual Machines (Critical and Non-Critical) as labeled data, both would have a set of attributes like: critical strings, nature of the application being hosted number of applications, size, data leg, device ports, data path available, datastore size, provisioning details and so on. This represents only some criticality attributes or parameters (characteristics) and embodiments are not so limited. Any other or additional parameters characterizing the criticality, sensitivity, or specialness of a new data object may be used. Any new introduced data object into the system can be predicted to be classified into a critical or non-critical based on these attributes.

Figure 4:
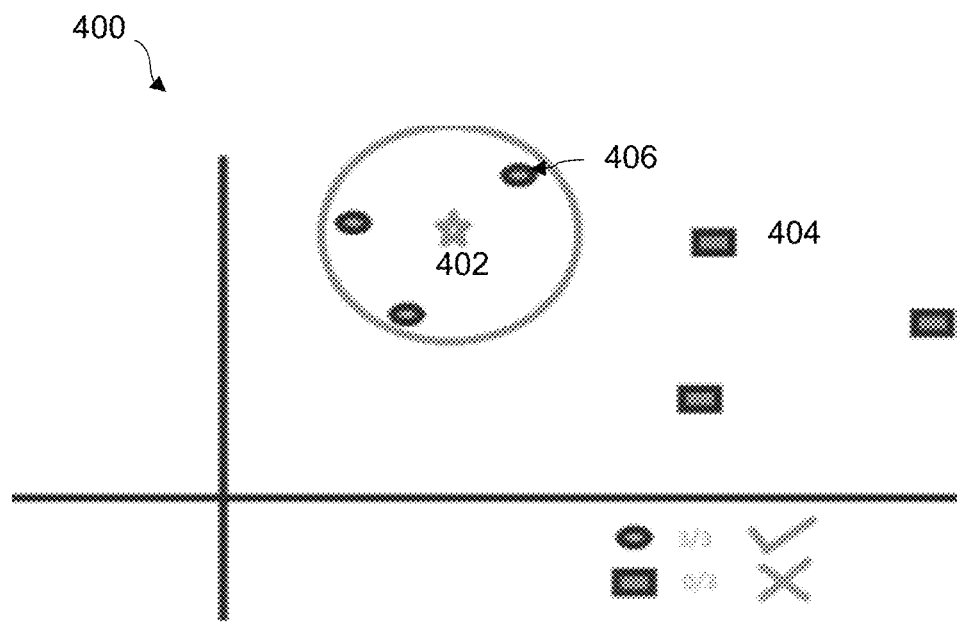
FIG. 4 illustrates an example depiction of a KNN implementation for dynamic policy creation, under some embodiments.

FIG. 4 illustrates a simple example depiction of a KNN implementation that can be used for a dynamic policy creation process, under some embodiments. Plot 400 of FIG. 4 shows that if a new input (star) is to be classified into a circle 406 or rectangle 404, then the KNN model would calculate the Euclidian distance between the "Star-Circle" and "Star-Rectangle" for three occurrences (K=3). Since the 3 Circles are closest to the new data (star), so the category of this can be classified as circle.

Figure 5:
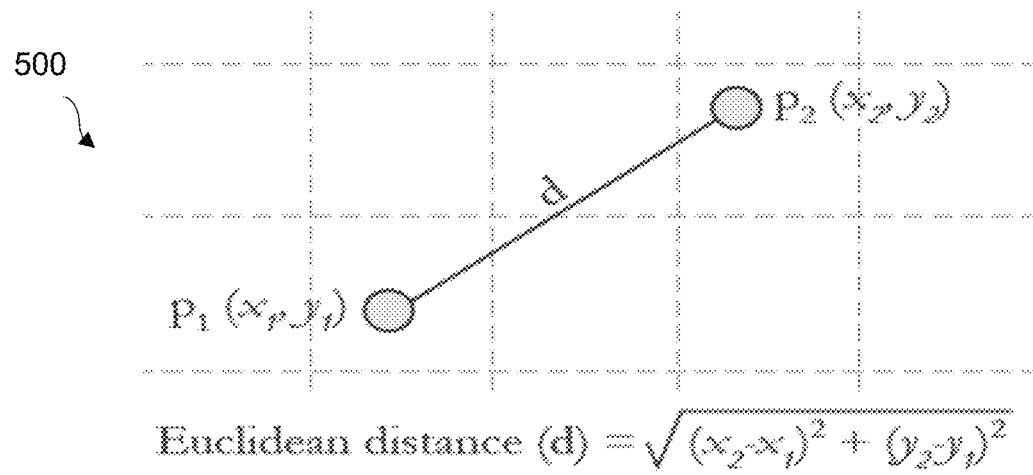
FIG. 5 illustrates a plot representation for the calculation of Euclidean distance for a KNN implementation, under some embodiments.

FIG. 5 illustrates a plot representation 500 for the calculation of Euclidean distance for a KNN implementation, under some embodiments. As shown in FIG. 5, the Euclidean distance (d) between points $P_1$ ($x_1$, $y_1$) and $P_2$ ($x_2$, $y_2$) is calculated by the following formula:

$$d = SQRT\left((x_2 - x_1)^2 + (y_2 - y_1)^2\right)$$

For some embodiments of FIG. 1, the KNN model used in this solution leverages multiple parameters to decide the criticality of new data objects received through an adhoc backup request or similar mechanism to implement priority tagging-based backup in the data protection process. The model 308 for the KNN classifier 304 is trained with historical data of the clients, datasets, and backups from users and certain laboratory environments to ensure maximum accuracy in the prioritization of new backup objects. The historical data may be amassed from many years operation of deployed systems as well as theoretical or simulated data provided through laboratory simulations. It may also comprise current user configuration and deployment information including presently desired or used attributes and corresponding values.

Using this trained model, the most critical data can be prioritized for backup first followed by non-critical data. Such data may also be processed through new or modified policies that dictate important parameters such as backup period, storage target, retention period, data handling, and so on.

Figure 6:
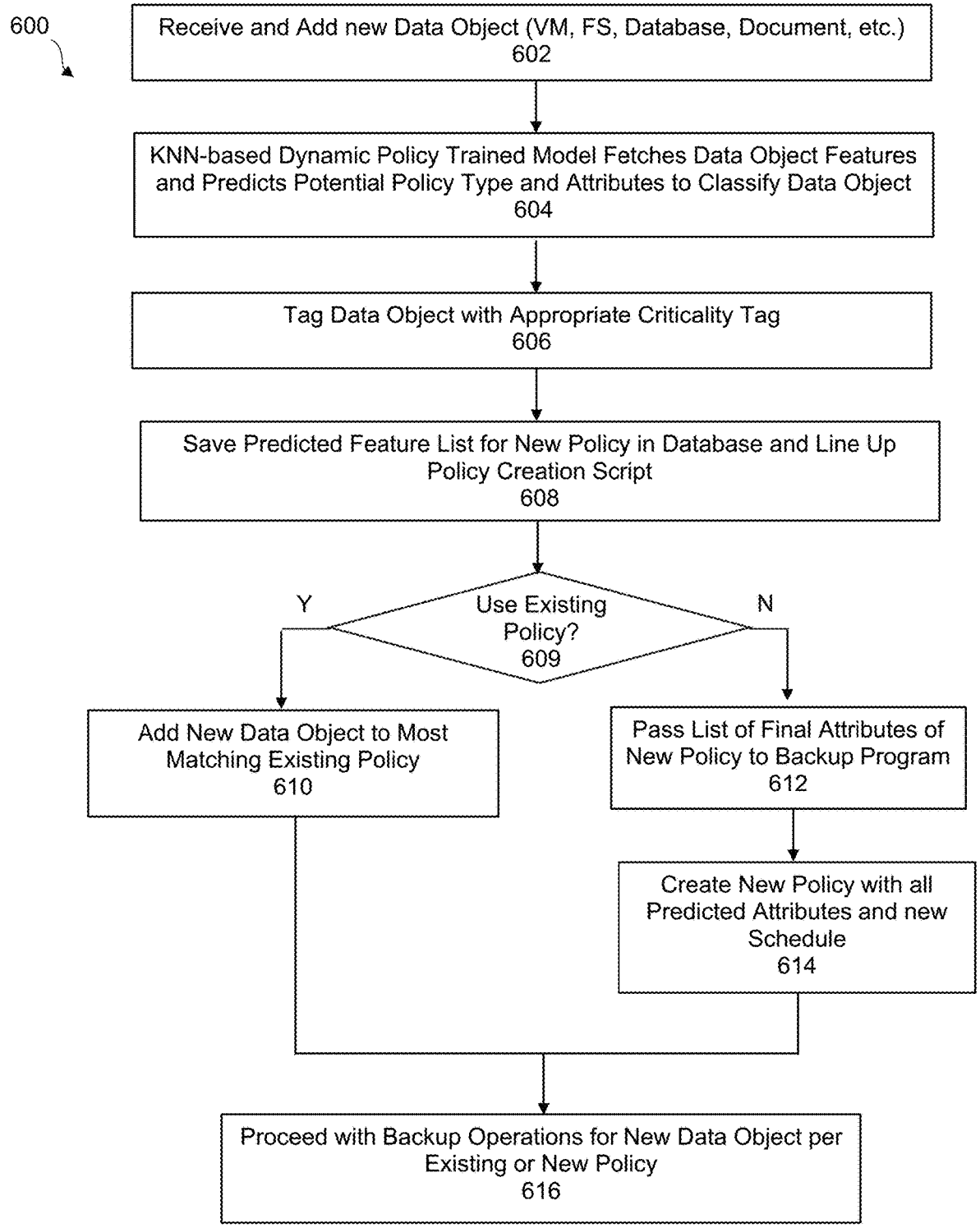
FIG. 6 is a flowchart that illustrates a method of providing dynamic policy creation using data criticality for tagged data and clients, under some embodiments.

FIG. 6 is a flowchart that illustrates a method of providing dynamic policy creation using data criticality for tagged data and clients, under some embodiments. As shown in FIG. 6, process 600 starts in step 602 with the receiving or addition of a new data object and client into the system, such as through an adhoc backup request. The data object/client may be any appropriate elements, such as a virtual machine, filesystem, database, document, and so on. In step 604, the classifier component 304 uses the trained model to fetch data object features to predict the potential policy or policy type and the data object attributes in order to classify the data object as critical or non-critical. The data object is then tagged with the classified criticality tag, 606

The predicted feature list is then saved into a database and a policy creation scripts is lined up, 608. This step entails a process of executing an existing script that creates the protection policy once the ML model 308 has predicted and determined all the necessary features of the new backup protection policy. The script is updated with the newly determined features and is ready for execution in the user system. The dynamic nature of the smart policy dictates its features. Policies can be hierarchically defined along a rank, such as Platinum Protection policy incorporating data objects with the most critical features, followed by Gold, Silver, and Bronze policies in descending order of priority, or any other similar scale.

After calculating the final criticality score of a data object and tagging it accordingly, the process checks whether the data object falls within the acceptance value range of an existing protection policy, 609. If it does, the data object is aligned with the existing policy, 610. This is done by setting the policy definitions to include the new data object and client. Otherwise, a new policy is created, 614. For this new policy, the process passes the list of final attributes of the new policy to the backup program, 612. The new policy is then created with the new predicted attributes, including any new protection schedule, 614. The backup operations can then proceed for the new data object per the existing policy (per step 610) or the new policy (per step 614). The acceptance value of the protection policy is determined using the machine learning model both during the deployment of new dynamic policies and after the creation of older or existing protection policies.

The backup schedule for a group of routine or known clients and data objects is generally defined by default backup policies and priorities. Through process 600, as new clients and data objects are included in the backup process, the dynamic policy creation process 220 automatically classifies these new objects and selects or creates an appropriate protection policy based on the criticality of the new data objects and clients.

As used herein, "supervised learning" refers to a subcategory of machine learning (ML) and artificial intelligence (AI) that is defined by the use of labeled datasets to train algorithms that to classify data or predict outcomes accurately. In an embodiment, the KNN process is used for the data classification to classify current and new data objects with respect to criticality and backup/restore prioritization within an overall data protection process.

In an embodiment, the dynamic policy creation component 301 utilizes certain artificial intelligence (AI) and machine learning (ML) processes to evaluate new data objects using various attributes to generate the model 308 and classify data objects and clients as critical or non-critical. Such a process generally uses a training component that continuously trains a machine learning algorithm.

Figure 7:
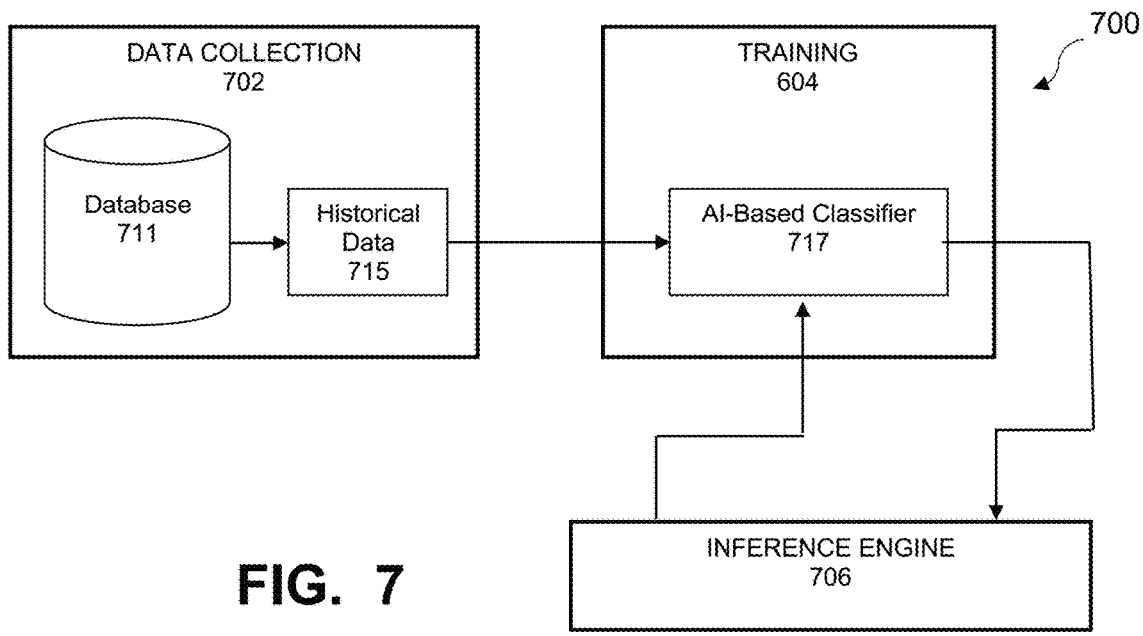
FIG. 7 illustrates a general AI/ML component used in a dynamic policy creation component, under some embodiments.

FIG. 7 illustrates a general AI/ML component used in a dynamic policy creation component, under some embodiments. System 700 of FIG. 7 includes a data collection component 702, a training component 704, and an inference component 706. The data collection component 702 can comprise various data loggers and I/O capture devices and databases 711 along with a body of historical information 715 about past data objects, clients, and events (e.g., backup operations). The data collection component 702 continuously monitors and collects data objects and event data to build up its database. This collected information is submitted to the training component 804 through an AI-based analyzer 717. This component continuously trains a machine learning algorithm to identify the data object attributes to thereby determine a relative backup priority of a new data object and/or client. The inference engine 706 also continuously trains the AI/ML algorithms through monitored events.

The AI component of system 700 may employ any suitable AI algorithm, such as KNN or RNN, or similar algorithm. In general, the performance required to handle the vast variation of data source types and huge size of the big data involved, which may be in zeta bytes of range, may be achieved with low latency and high throughput through embodiments described herein. Furthermore, through these AI processes, the decisions to tag the data object as critical or non-critical is done in real-time. Such AI mechanisms may be scaled and modified for different application needs and system configurations.

Figure 8:
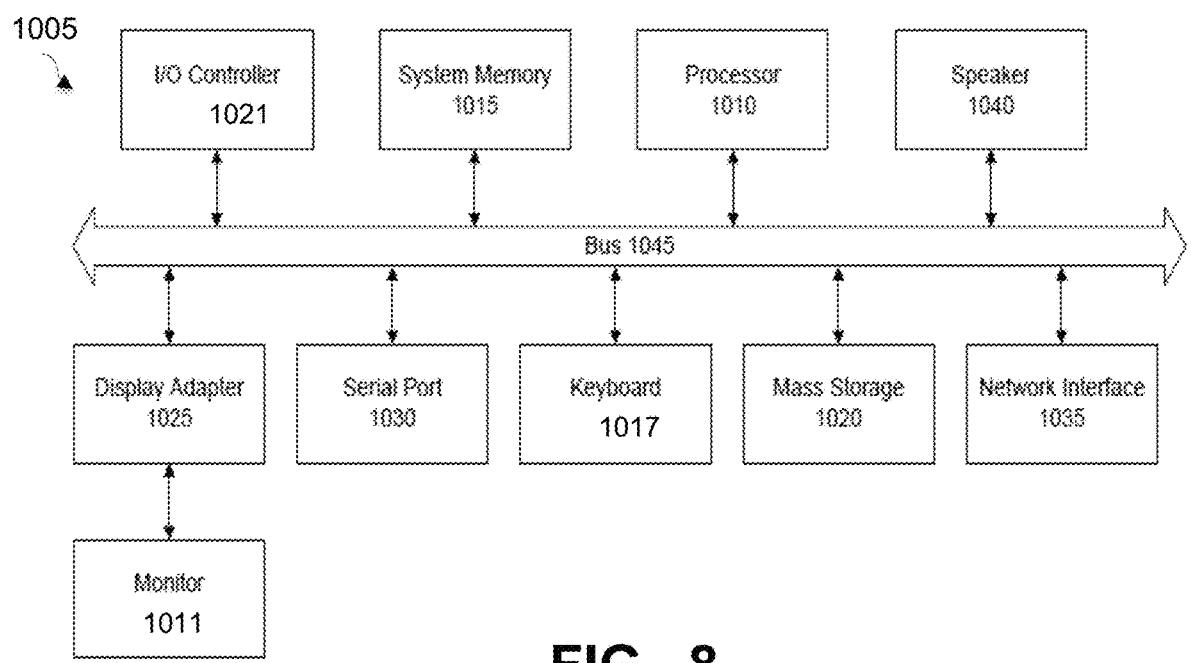
FIG. 8 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 8 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11.x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of selecting a protection policy for a data object in a data protection system, comprising:
   receiving for protection, the data object as sourced by a client;
   receiving a request to backup the data object on an adhoc basis outside of a planned backup schedule and adding or deleting system resources;
   classifying the data object as critical or non-critical based on attributes associated with the data object or client;
   tagging the data object with a corresponding criticality tag;
   determining if the tagged data object can be protected with an existing policy or a new policy;
   using historical data from users of customer backup environments with certain laboratory derived data to train a machine learning (ML) model using the attributes to decide one of a selection of the existing policy or creation of a new policy to automatically process the received data object;
   fetching data object features using the trained model to predict a potential policy and the associated attributes to perform the classifying;
   creating the new policy based on the associated attributes once the ML model has predicted and determined all necessary features of the new policy; and
   backing up the data object in accordance with the existing or the new policy.

2. The method of claim 1 wherein the data object is received through an adhoc backup request comprising at least one of a request to backup the data object, or create or destroy a client representing a source of the data object.

3. The method of claim 1 wherein the attributes represent criticality parameters and are selected from a group consisting of: data type, data source, storage requirements, lifecycle, application, user, critical strings, data leg, device ports, data path available, datastore size, and provisioning details.

4. The method of claim 3 wherein the criticality tag comprises metadata appended to the data object, and wherein the criticality tag is implemented as an alphanumeric string encoding a protection prioritization based on criticality.

5. The method of claim 4 wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

6. The method of claim 3 wherein the classifying comprises a k-nearest neighbors (KNN) algorithm that determines the criticality of the data object based on the attributes.

7. The method of claim 6 further comprising training a model for the KNN algorithm using historical data of data objects and clients including a present and past users and laboratory environments to establish past priorities of protection of user data.

8. The method of claim 7 wherein the classifying utilizes an artificial intelligence (AI) based component comprising a data collection component, a training component, and an inference component, and contains historical information regarding data objects and clients of the system to continuously train a machine learning (ML) algorithm of the model to identify backup prioritization of the user data.

9. The method of claim 8 wherein the system comprises a PowerProtect Data Domain deduplication backup system.

10. A system for selecting a protection policy for a data object in a data protection system, comprising:
    an interface receiving for protection, the data object as sourced by a client;
    a processor-based classifier classifying the data object as critical or non-critical based on attributes associated with the data object or client;
    a tagger tagging the data object with a corresponding criticality tag, and determining if the tagged data object can be protected with an existing policy or new policy;
    a training component for a machine learning (ML) model using historical data from users of customer backup environments with certain laboratory derived data to train the ML model using the attributes to decide one of a selection of the existing policy or creation of a new policy to automatically process the received data object, wherein the classifier fetches data object features using the trained model to predict a potential policy and the associated attributes to perform the classifying;
    a component creating the new policy based on the associated attributes once the ML model has predicted and determined all necessary features of the new policy; and
    a hardware-based backup component backing up the data object in accordance with the existing or new policy.

11. The system of claim 10 wherein the data object is received through an adhoc backup request comprising at least one of a request to backup the data object, or create or destroy a client representing a source of the data object.

12. The system of claim 11 wherein the attributes represent criticality parameters and are selected from a group consisting of: data type, data source, storage requirements, lifecycle, application, user, critical strings, data leg, device ports, data path available, datastore size, and provisioning details.

13. The system of claim 12 wherein the criticality tag comprises metadata appended to the data object, and wherein the criticality tag is implemented as an alphanumeric string encoding a protection prioritization based on criticality, and further wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

14. The system of claim 12 wherein the classifying comprises a k-nearest neighbors (KNN) algorithm that determines the criticality of the data object based on the attributes.

15. The system of claim 14 further comprising a model trained for the KNN algorithm using historical data of data objects and clients including a present and past users and laboratory environments to establish past priorities of protection of user data.

16. The system of claim 15 wherein the classifier utilizes an artificial intelligence (AI) based component comprising a data collection component, a training component, and an inference component, and contains historical information regarding data objects and clients of the system to continuously train a machine learning (ML) algorithm of the model to identify backup prioritization of the user data.

17. The system of claim 16 wherein the system comprises a PowerProtect Data Domain deduplication backup system.

18. A non-transitory computer program product having stored thereon program instructions that, when executed by a processor, cause the processor to perform a method of selecting a protection policy for a data object in a data protection system, comprising:
- receiving for protection, the data object as sourced by a client;
- receiving a request to backup the data object on an adhoc basis outside of a planned backup schedule and adding or deleting system resources;
- classifying the data object as critical or non-critical based on attributes associated with the data object or client;
- tagging the data object with a corresponding criticality tag;
- determining if the tagged data object can be protected with an existing policy or a new policy;
- using historical data from users of customer backup environments with certain laboratory derived data to train a machine learning (ML) model using the attributes to decide one of a selection of the existing policy or creation of a new policy to automatically process the received data object;
- fetching data object features using the trained model to predict a potential policy and the associated attributes to perform the classifying;
- creating the new policy based on the associated attributes once the ML model has predicted and determined all necessary features of the new policy; and
- backing up the data object in accordance with the existing or the new policy.

19. The product of claim 18 wherein the data object is received through an adhoc backup request comprising at least one of a request to backup the data object, or create or destroy a client representing a source of the data object.

20. The product of claim 19 wherein the attributes represent criticality parameters and are selected from a group consisting of: data type, data source, storage requirements, lifecycle, application, user, critical strings, data leg, device ports, data path available, datastore size, and provisioning details.

* * * * *